Nov. 21, 1939.  S. PRZYBOROWSKI  2,181,107
METHOD OF MAKING CROSS-FIN COILS
Filed Dec. 2, 1936  9 Sheets-Sheet 1
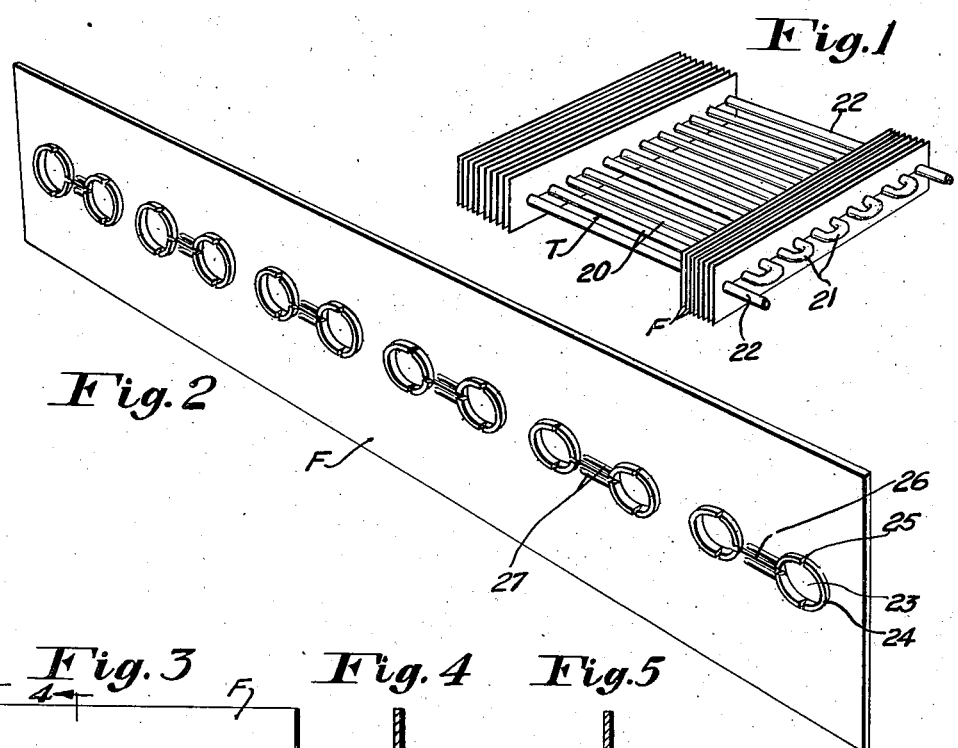
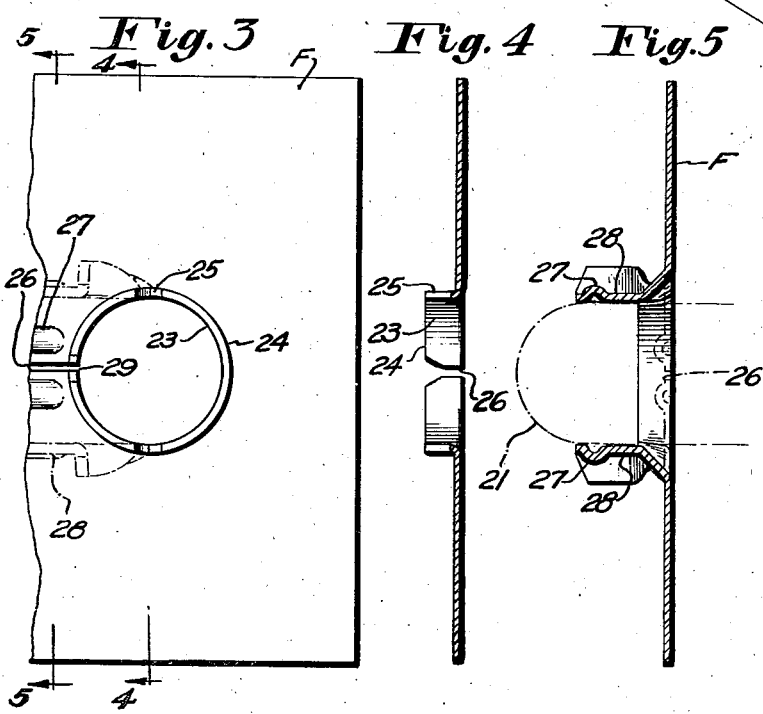
Inventor
Stanislaus Przyborowski
By Albert R. Henry
Attorney

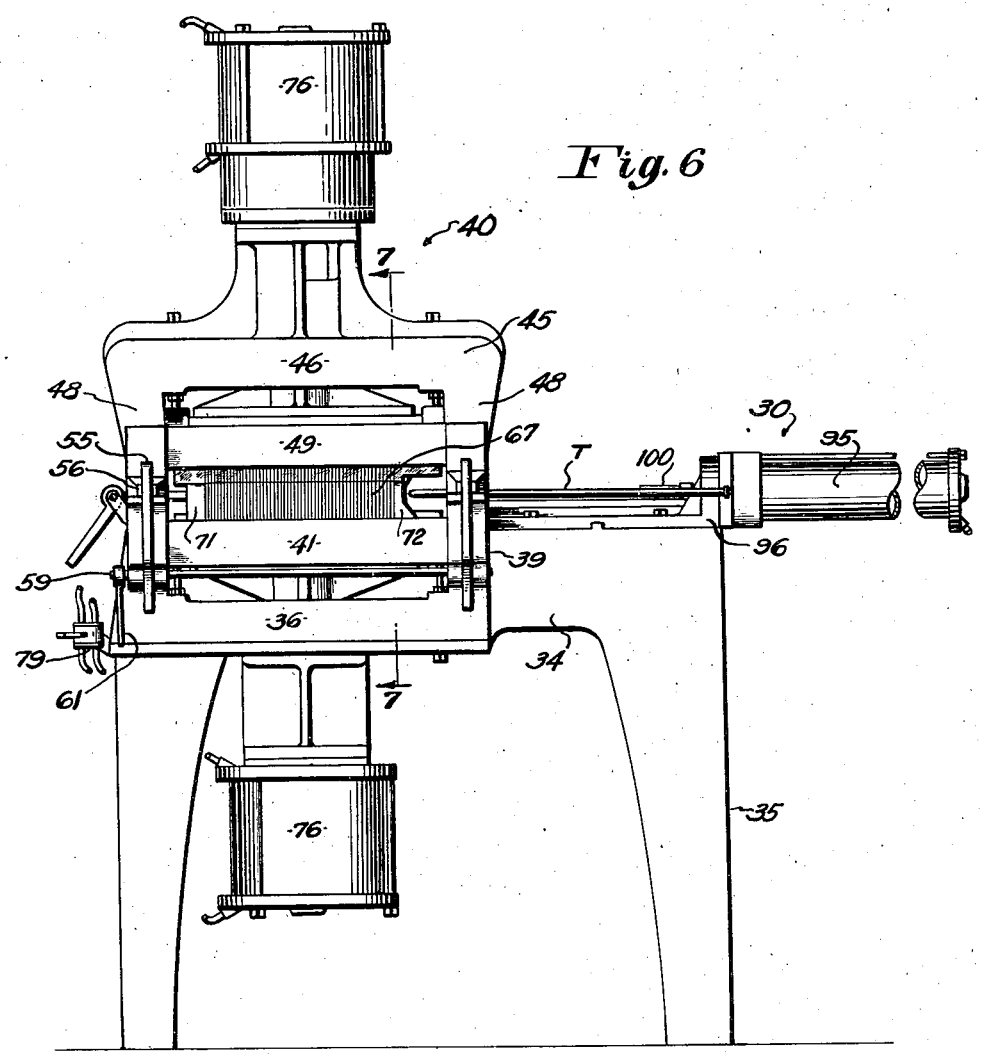

Nov. 21, 1939.　　　　S. PRZYBOROWSKI　　　　2,181,107
METHOD OF MAKING CROSS-FIN COILS
Filed Dec. 2, 1936　　　9 Sheets-Sheet 6

Inventor
Stanislaus Przyborowski
By Albert R. Henry
Attorney

Nov. 21, 1939.  S. PRZYBOROWSKI  2,181,107
METHOD OF MAKING CROSS-FIN COILS
Filed Dec. 2, 1936   9 Sheets-Sheet 7

Inventor
Stanislaus Przyborowski
By Albert R. Henry
Attorney

Nov. 21, 1939.  S. PRZYBOROWSKI  2,181,107
METHOD OF MAKING CROSS-FIN COILS
Filed Dec. 2, 1936  9 Sheets-Sheet 8

Inventor
Stanislaus Przyborowski
By Albert R. Henry
Attorney

Nov. 21, 1939.  S. PRZYBOROWSKI  2,181,107
METHOD OF MAKING CROSS-FIN COILS
Filed Dec. 2, 1936  9 Sheets-Sheet 9

Inventor
Stanislaus Przyborowski

By Albert R. Henry
Attorney

Patented Nov. 21, 1939

2,181,107

UNITED STATES PATENT OFFICE 2,181,107

METHOD OF MAKING CROSS-FIN COILS

Stanislaus Przyborowski, Buffalo, N. Y., assignor to Fedders Manufacturing Company, Inc., Buffalo, N. Y.

Application December 2, 1936, Serial No. 113,867

9 Claims. (Cl. 113—118)

This invention relates to a method of making cross-fin coils, or heat exchange coils of the type having connected parallel stretches of tubing passing through transversely disposed and parallel fins.

The present invention finds particular application to the manufacture of cross-fin coils having integral return bends and substantially continuous transverse fins, although it will be understood, from the following description and appended claims, that the invention is applicable to the manufacture of coils which need not include both, or either, of these factors of thermal effectiveness.

According to the present invention, it is proposed to assemble transverse fins on tubes by pushing the fins over the tubes, or the tubes over the fins, and, after the fins are brought to the desired position, to apply pressure to outstanding portions of the fins to effect a tighter engagement with the tubes. In carrying out this phase of the invention, the tubes may be formed with integral return bends which are driven through the metal of the fins, the metal in such instance advantageously being weakened, as by slitting, so that there is no excessive resistance to the passage of the tube through the fin. The subsequent pressing operation serves to restore to their original position the portions of the fin deformed by the transfixing operation, thus enhancing the frictional engagement between tubes and fins, and thereby increasing the thermal conductivity.

In order to apply the invention in a practical way, there is provided means for holding the fins so they may be impacted and transfixed by the tubes, which holding means may subsequently be moved over the surface of the fin, to operate as a closing die against outstanding and deformed fin portions. For assembling simultaneously a plurality of fins on the tubes, the holding and closing members may be mounted alongside of each other, with spacers therebetween, thus forming what is commonly known as a comb, or nest, for holding as many fins as are necessary for each length of tubing. As hereinafter more fully described, the herein-illustrated embodiment of the invention provides for the housing of the die members in a pair of frames which may be opened to insert and remove the fins and tubes, but held together during the actual assembling operations.

In this aspect of the invention, there is provided not only a nest but one which is made of two or more sections which are so disposed as to be relatively movable, and which sections are made of elements also having the functions of a die. So far as I am aware, it is a novel feature of this invention to provide fin and tube assembling means in which the fin holding members also constitute movable die members, and it is therefore intended to claim such novel and useful structure, whether used in a nest or as a single fin applying means.

The invention further contemplates the association, with the fin holding nest, of means for loading the die comb with the fins. The particular means hereinafter described takes the form of a secondary nest which may be manually loaded and then bodily applied to the assembling comb to transfer the fins.

Other related or more specific aspects of the invention, together with the advantages to be derived from the practice thereof, will be apparent from the following description, in which reference is made to the embodiment of the invention shown in the accompanying drawings, wherein:

Fig. 1 is a perspective view of a cross-fin coil unit with some of the fins omitted to show the tube disposal;

Fig. 2 is a perspective view of a fin prior to assembly on the tubes;

Fig. 3 is a fragmentary view of a fin, drawn on an enlarged scale;

Fig. 4 is a section on the line 4—4 of Fig. 3;

Fig. 5 is a section on the line 5—5 of Fig. 3, with the flap portions of the fin bent back;

Fig. 6 is a front elevation of an assembling machine with the die elements shown in tube assembling position;

Figure 7:
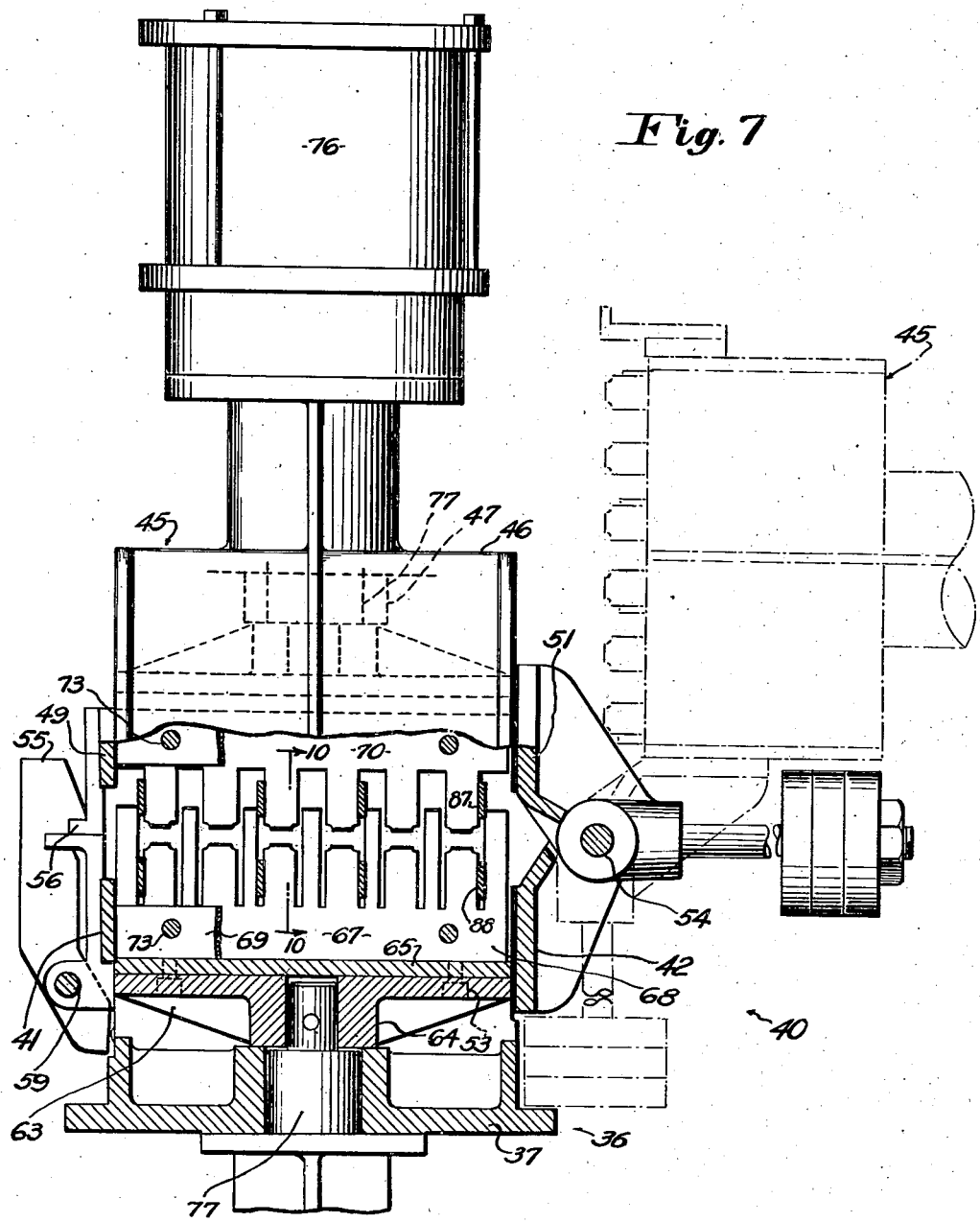
Fig. 7 is a section on the line 7—7 of Fig. 6.

The present invention is particularly adapted to the manufacture of fin and tube assemblies useful for heat transfer purposes. A specific form of such unit, as shown in Fig. 1, comprises a continuous tube T bent to provide parallel legs or straight stretches 20 connected by integral loops or return bends 21, the extremities of the coil being defined by terminal legs 22. Disposed transversely of the legs are a plurality of spaced parallel fins F, the specific formation of which is best shown in Fig. 2. Each fin F is in the form of a substantially plane rectangular sheet which, prior to assembly on the tubes, is formed with spaced openings 23 defined by surrounding flanges 24 which are notched as indicated by the reference numeral 25. The metal in the plane area between adjacent pairs of openings is weakened during the pre-forming operation, as, for example, by slits 26 which may be bordered by rib portions 27.

It will be understood that, in the assembled completed unit, the fins F are disposed transversely of the tube legs 20, with the metal between adjacent legs disposed in the plane of the fin. However, since it is contemplated that the tube T shall be continuous, the present invention provides for the weakened portions which, during the assembly operation, may be bent out by the action of the tube loops 21 as the tubes are forced bodily through the fins. Subsequent to the positioning of the fins on the tubes, the bent portions thereof are restored to their original position.

Thus, in Fig. 3, it will be observed that the fin F has a substantially plane surface, except around the openings 23, which are flanged. In Fig. 5, it is to be assumed that the tube T has just been forced against the fin to bend back the weakened portion in the form of flaps 28, which later are restored to the position indicated by the dotted lines in this figure. This restoration of the flaps is accompanied by a tightening action between the flanges 24 and the tube legs 20.

In the bending back of the flaps 28 by the impacting action of the tube, the notches 25 serve to relieve some of the bending strains at the flanges 24. In forming the rib portions 27, the metal adjacent the lips of each slit is drawn sufficiently to provide a gap 29 which, during the two bending operations, prevents overlapping of the lips. When the fins are fully assembled on the tubes, the rib portions 27 serve to produce an additional turbulence in an air stream passing over the fins, thereby increasing the heat transfer in the sectors immediately adjacent the junction of the fins and the tubes.

Figure 8:
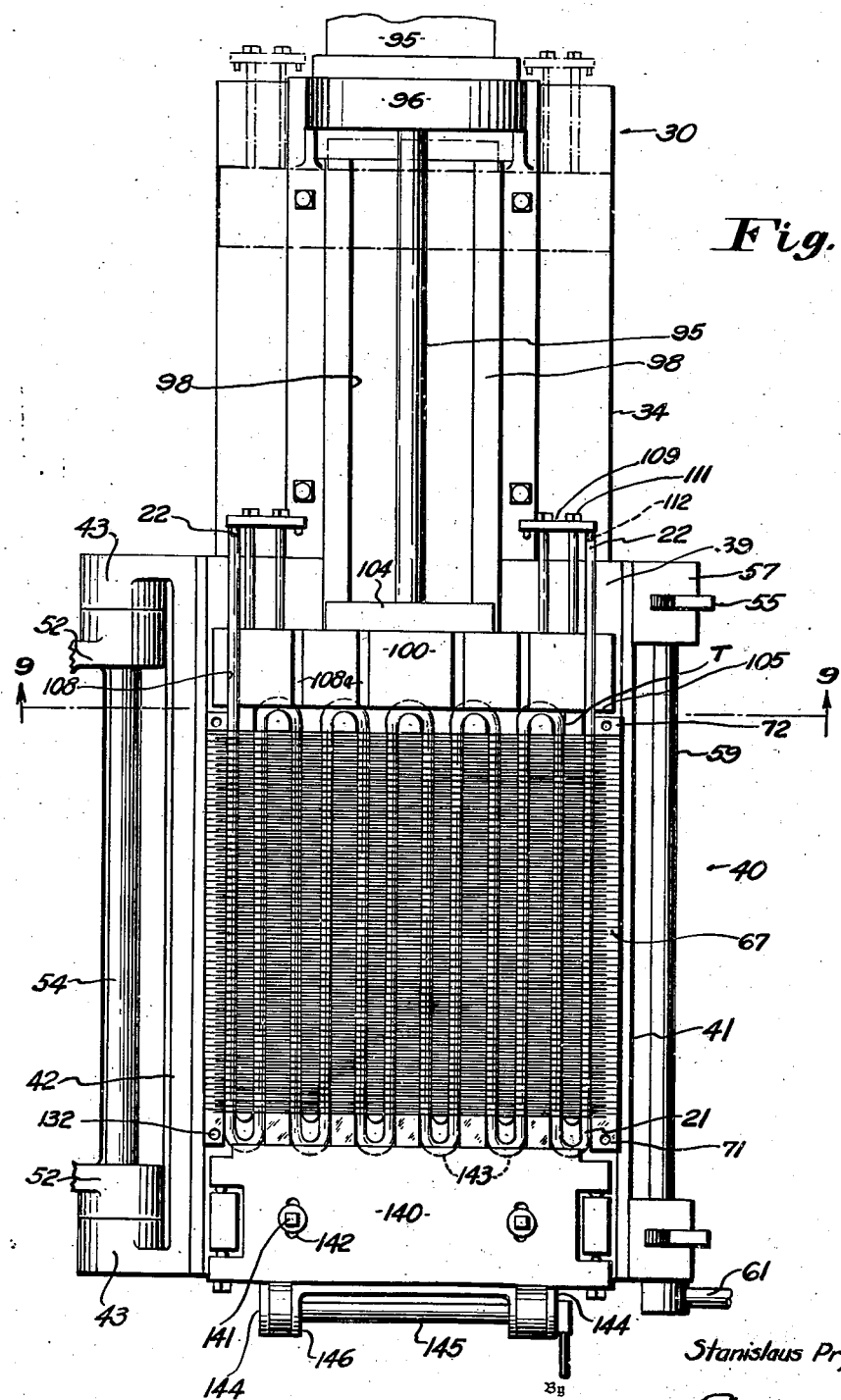
Fig. 8 is a top view of the machine, with the upper die members removed.

A suitable machine for effecting the assembly of the fins and tubes is illustrated in the subsequent figures of the drawings, and it includes generally a horizontally disposed tube impelling unit 30, and a vertically disposed die mechanism 40, both of which are mounted on a machine body 34 supported on legs 35, as shown in Fig. 6. The operating elements of the die mechanism are mounted in a two-part box or holder structure, the lower portion of this structure comprising a frame 36 forming a part of the body 34. The frame 36 is provided with a base 37 containing a central bearing 38 and spaced upstanding side walls 39. The side walls are connected at their front and rear faces by straps 41 and 42 respectively, the rear strap 42 being formed with spaced hinge knuckles 43 (Fig. 8).

An upper die holder or frame 45, which is pivotally mounted on the frame 36, is structurally similar thereto, comprising a base 46 having a central bearing 47 and depending side walls 48 connected by straps 49 and 51. The straps 51 are formed with hinge knuckles 52 (Fig. 7) which are connected with the knuckles 43 by a hinge pin 54. It will thus be understood that the upper and lower die holding structures may be disposed in superimposed relation, or the upper structure may be swung away from the lower member, as shown by the dotted lines in Fig. 7, to permit the insertion of fins in the dies and the removal of the assembled coil unit from the machine. When in superimposed relation, the two parts of the die holder may be secured to each other by latch members 55 engaging latch lugs 56 on the upper frame 45. The latches 55 are mounted in slotted bearings 57 forming part of the side members 39, and the latches are secured to a transverse shaft 59 which is journalled in the bearing portions 57. The latches may be readily operated to lock or to permit the opening of the upper die box by an attached operating handle 61.

Figure 17:
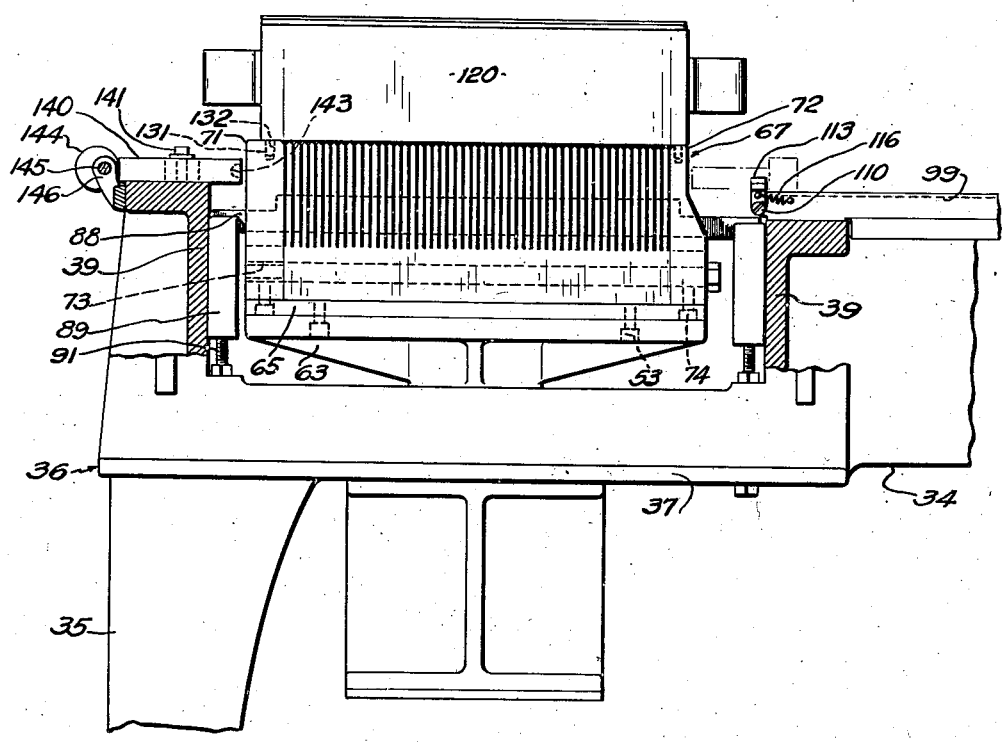
Fig. 17 is a fragmentary front view of the die portion of the machine, showing the loading nest positioned on the lower die unit.

Each of the holders 36 and 45 is adapted to receive complementary sections of a fin holding and bending structure, which, in the present embodiment of the invention, are disposed for vertical movement within the holders. As best shown in Figs. 7 and 17, the lower frame or holder 36 contains a vertically movable die shoe 63 having a central hub 64 aligned with the bearing 38 on the fixed base 37. Secured to the upper face of the shoe 63, by means of screws 53, is a base plate 65, to which in turn is secured a group of lower die elements 60 forming in their entirety a die nest 67. The die elements 60 are in the form of separate plates 68, which are spaced by interposed separators 69 to form pockets P therebetween. As illustrated further in Figs. 8 and 17, the plates and separators are held together by means of relatively heavy end plates 71 and 72 and through bolts 73. The plates 71 and 72 are tapped to receive screws 74 (Fig. 17) which rigidly secure the die assembly to the base plate 65.

The upper complementary assembly in the holder 45 is of similar general construction, except for the contour of the die elements 70 themselves, which will be hereinafter more fully described. As the structure is otherwise identical for all practical purposes, further description thereof will therefore not be made. It will be understood, however, that the combined fin spacing, holding, and bending units are mounted in each holder, and they may be mounted in superimposed relation and are movable bodily toward each other.

Figure 10:
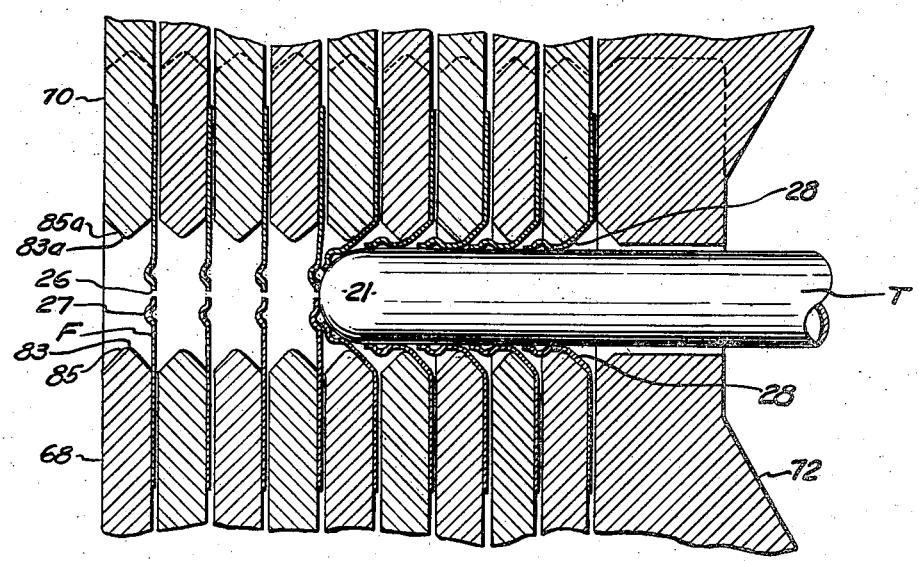
Figs. 10 and 11 are enlarged sectional views taken on the line 10—10 of Fig. 7, showing the die elements in tube receiving and closed positions respectively.
Figure 11:
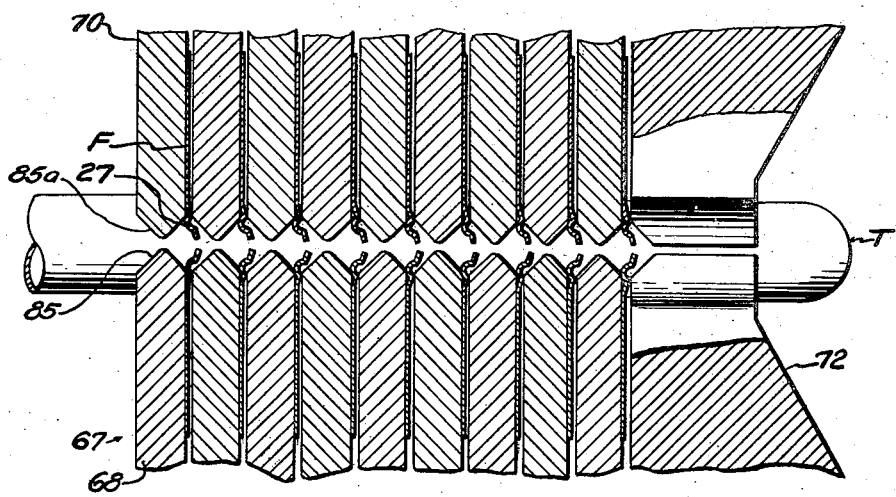

It may here be explained that the fins are inserted in the pockets P between the die members 68, whereupon the upper frame 45 is brought into the closed position shown in Fig. 7, to engage the protruding edges of the fins. At such time, the dies 68 and 70 are spaced, as shown in Fig. 7, and also in Figs. 10 and 12. It is at this point in the operation that the tube is forced through the bank of fins, deforming the impacted metal thereof as shown in Fig. 10. Subsequently the die elements 68 and 70 are moved closer together, as shown in Figs. 11 and 13, to restore as much as possible the fin metal to its original position.

The actuating means for the die nests herein takes the form of like pneumatic cylinders 76, which, as best shown in Figs. 6 and 7, are mounted on the bases 37 and 46 of the upper and lower die holding frames. The piston rods 77 of each cylinder project through the aligned bearing openings in the frames and are secured in the hubs 64 of the die shoes 63. The simultaneous extension or retraction of the pistons in the cylinders 77, and hence the spacing of the die elements 68 and 70, is controlled by a single valve 79 accessibly located on the machine body. As the nature of such control valves is well understood, and the precise details of the connections between the valves and cylinders form no part of the present invention, further description of the mechanism is therefore deemed unnecessary.

Figure 12:
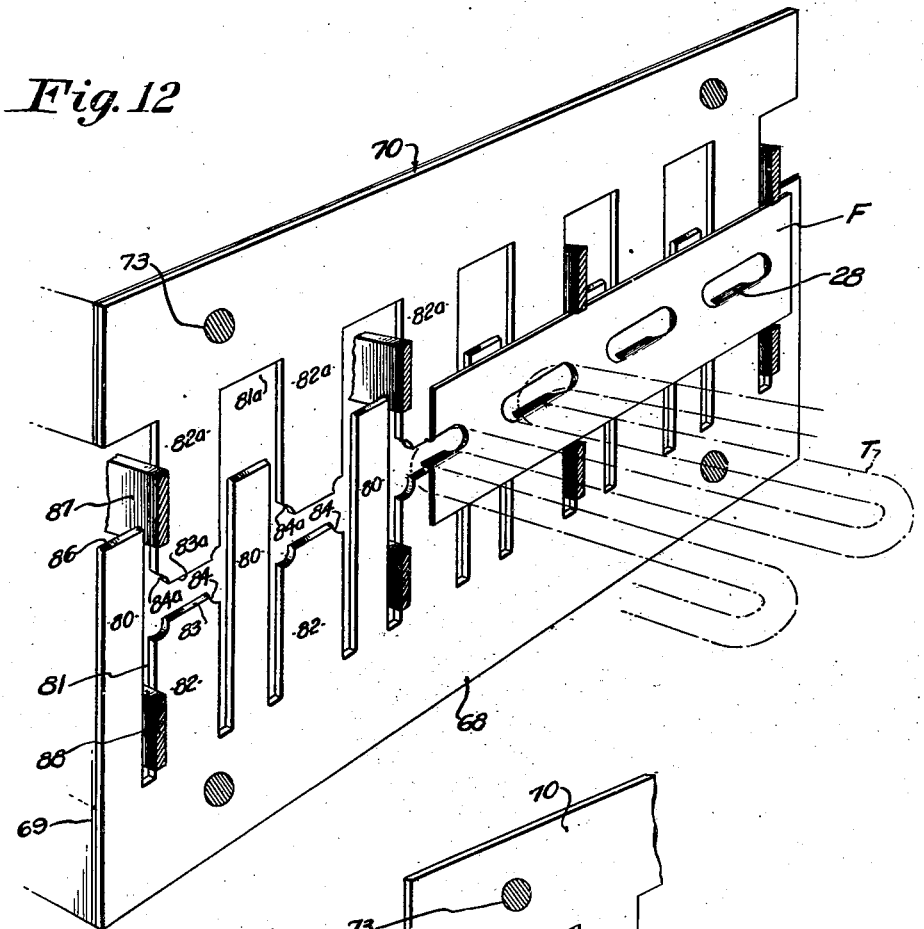
Fig. 12 is a perspective view, more or less diagrammatic, showing one pair of die plates disposed in the tube receiving position of Fig. 10.
Figure 13:
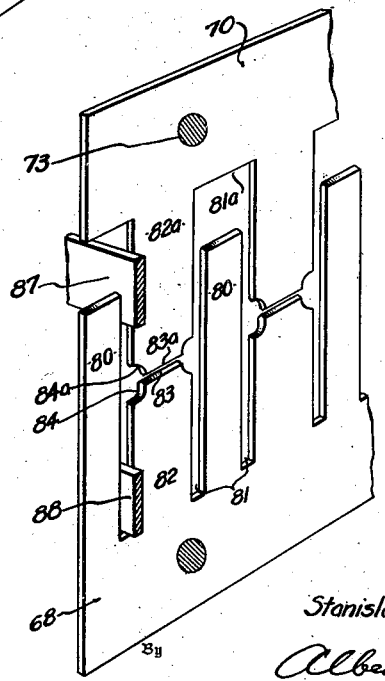
Fig. 13 is a view similar to Fig. 12, showing the dies after movement from the position of Fig. 12 to closed position.
Figure 14:
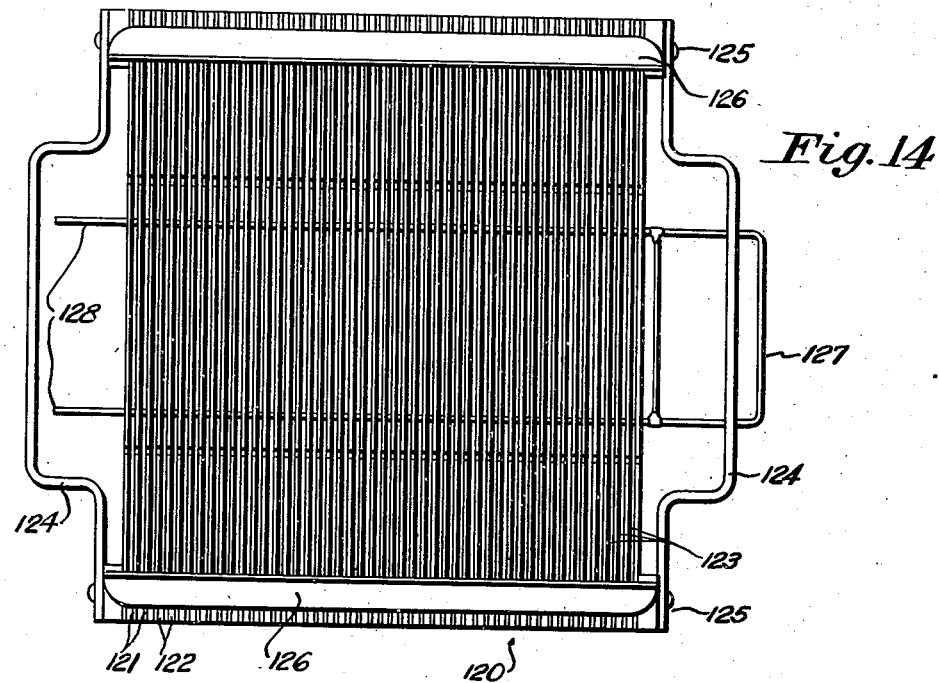
Fig. 14 is a top view of a loading nest for inserting fins between the several dies of the assembling machine.
Figure 15:
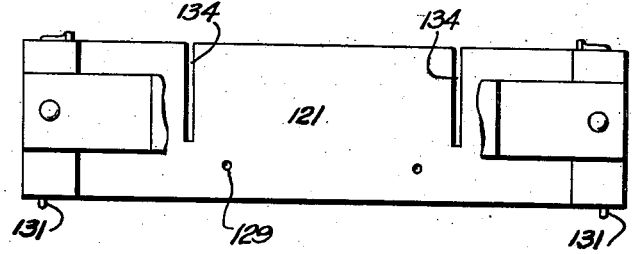
Fig. 15 is a front view of the nest, with the handle portion broken away.
Figure 16:
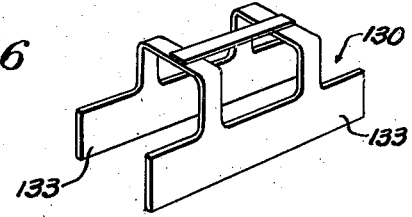
Fig. 16 is a perspective of a charging tool for transferring fins from the nest to the assembling machine.

The die elements 68 and 70 shown in Fig. 7 are also illustrated in Fig. 12, wherein it will be observed that the lower die 68 is formed with a plurality of vertical notches 81 to define die fingers 82 and interposed holding fingers 80 projecting above the tops of the fingers 82. The die 70 is formed with identical and vertically aligned die fingers 82a separated by relatively wide notches 81a which receive the ends of the holding fingers 80. The opposed horizontal surfaces of the die fingers 82 and 82a form complementary bending die portions 83 and 83a, while the corners are formed with quadrantal notches 84 and 84a adapted to engage the flanges 24 of the fins F. The portions 83 and 83a are also formed with rounded or pointed crests 85 and 85a, as best shown in the cross-sectional view, Fig. 10. The holding fingers 83 are likewise formed with crests 86 which permit of ready insertion of the fins in the die bank or comb 60, and also facilitate subsequent relative movement of the die members and the fins.

The holding fingers 80 are sufficiently spaced from the upper die fingers 82a to permit insertion therebetween of upper and lower holding bars 87 and 88, extending transversely of and beyond the die banks, and held in a relatively fixed position by means hereinafter described. These bars serve to support the fins interposed between the die fingers and to retain them in fixed position during the assembling operations.

It will be noted, by further reference to Figs. 10 and 12, that the holding fingers 80 are sufficiently spaced to permit the passage of an integral return bend 21 of the tube T. During the passage of the tube T through the fins disposed in the aligned pockets P of the adjacent dies 68 and 70, the portions of fin impacted by the tube bends are bent over the horizontal portions of the dies 82 and 82a to form the flaps 28. It will be observed that the pockets P receive the fins in a fairly snug fit, so that during this operation the vertical front faces of successive plates act as abutments to prevent collapse of the fin bodies.

After the tube T has been inserted through the fins, the dies are brought together to the positions shown in Figs. 11 and 13, thus causing the flaps 28 to be restored to their original position. During this operation, the quadrantal die portions 84, 84a engage the bent portions of the flanges 24 and restore them to their cylindrical shape in tight engagement with the legs 20 of the tube T.

The tube impelling unit 30 comprises a pneumatic cylinder 95 (see Figs. 6, 8, and 9) which is horizontally disposed on and secured to a head bracket 96 located at the right hand extremity of the machine body 34. The bracket is formed with horizontal slide rails 98 for receiving a carriage or cross head 100 formed with complementary slide bearing portions 101. The piston rod 102 of the cylinder 95 is secured in a hub 104 formed on the cross head 100 so that, upon actuation of the piston, the head is caused to be moved toward the die mechanism 40.

The vertical face 105 of the cross head 100 is formed with spaced sockets 106 (Fig. 9) adapted to receive the return loops 21 of the tube T when the head is in withdrawn position, as indicated by the dotted lines in Fig. 8. The terminal legs 22 of the tube T project through slots 108 formed in the top of the cross head 100, so that their open ends may abut extension plates 109 connected to the cross head by studs 111 for movement therewith. The extension plates may be provided with dowels 112 for entering the open tube ends to prevent lateral displacement during the assembling operations.

The cross head 100 may also be provided with additional slots 108a to accommodate coils having varying numbers of tube legs 21, thereby adapting the apparatus to the manufacture of heat exchange units of different sizes.

When the head 100 is in its retracted position, the left hand end of the tube T is supported by a transversely disposed bar 113 (Figs. 9 and 17) formed with grooves 114 adapted to receive the tube legs 20 and to guide them perpendicularly to the fin assembly as the head is moved. The bar 113 is formed with depending arms 115 pivotally connected to the bracket 96 by studs 110. Springs 116, secured to the arm 115 and the bracket 96, normally retain the bar 115 in position against the face of the bracket 96, but permit the bar to swing to an inoperative position when struck by the head 100 at the end of its forward travel.

From the invention as thus far described, it will be appreciated that after fins are disposed between the die members in the mechanism 40, the tube T, mounted on the cross head 100, is driven through the fins and between the dies, and subsequently the dies are operated to force the fin metal back to its original position. As this transfixing of the fins by the tubes, and the straightening of the fins, are both rather severe actions, it is advantageous to provide the holding bars 87 and 88 heretofore referred to.

Figure 9:
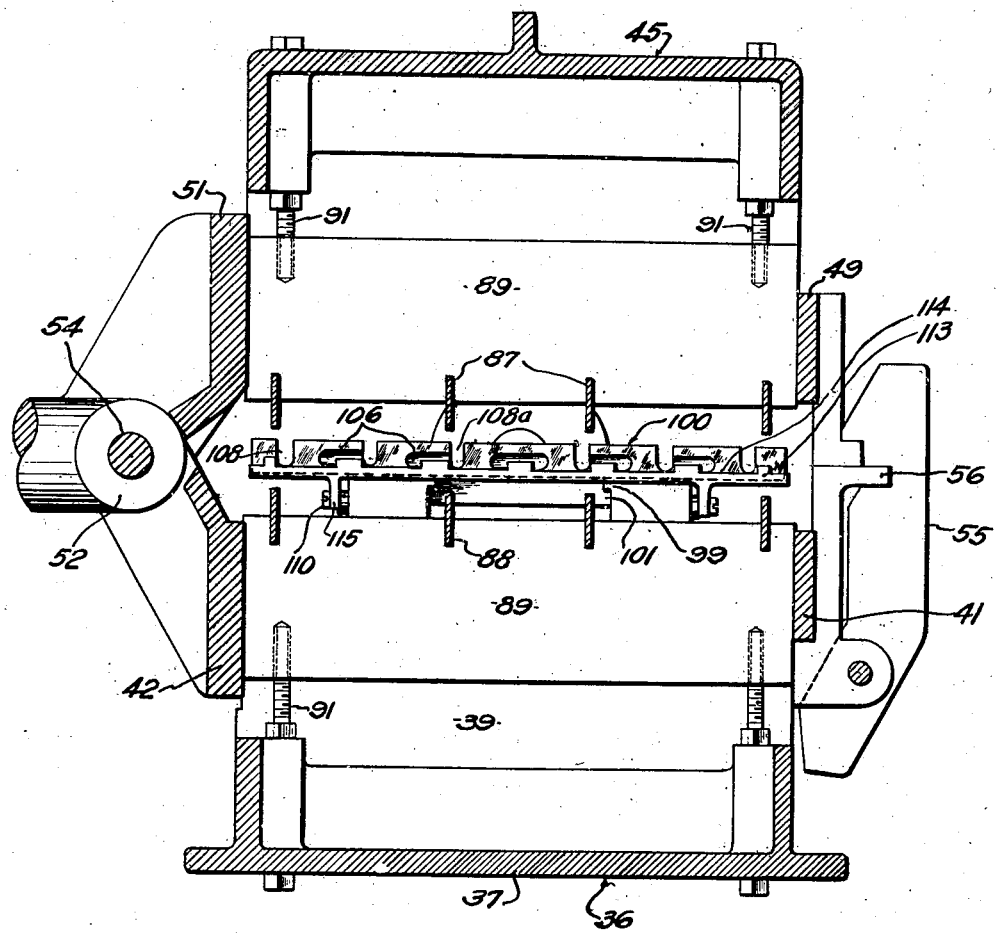
Fig. 9 is a section on the line 9—9 of Fig. 8, drawn on an enlarged scale.

The holding structure for the bars 87 and 88 is best shown in Figs. 6, 9, and 17. Disposed at either end of the die bank 60 are cross bars 89 which are adjustably secured to the adjacent frames by screws 91. The bars 87 and 88 are so spaced as to engage the fins F along their upper and lower edges when the upper head 45 is brought to closed position, thus firmly holding the fins against displacement.

In order to insert fins in the spaces or pockets P between the die elements 68, the upper head 45 is swung back, as shown by the dotted line position in Fig. 7, thus exposing the lower die assembly or comb 60. Fins F may thus be individually inserted into the spaces between the dies, each fin resting on the lower transverse bars 88. It is preferred, however, to insert all of the fins simultaneously, and this may be readily effected by employing an auxiliary loading nest 120, as illustrated in Figs. 14 to 17 inclusive.

The nest 120 consists of a plurality of plates 121 spaced by plates 122 to provide a plurality of fin pockets 123. Handles 124 are disposed at each end of the plate assembly, and the parts are secured together by long rivets 125 passing therethrough. The center to center distance between the pockets 123 is the same as the center to center distance of the pockets P, although the width of the pockets 123 is somewhat greater, so that the fins F may be more readily inserted in the auxiliary nest with a loose fit. Gauges 126 are secured to the top of the nest 120 at each side thereof and are positioned to serve as side guides during the insertion of the fins in the pockets 123. Horizontal alignment of and support for the fins in the nest 120 is obtained by a wire frame 127 having spaced legs 128 which may extend through aligned apertures 129 formed in the plates 121. Dowels 131, projecting from the lower corners of the nest 120, are adapted to enter holes 132 (Fig. 17) in the heavy end plates 71 and 72 of the lower die assembly, when the nest 120 is placed thereon.

When the auxiliary nest 120 is positioned on the lower die bank 60, as illustrated in Fig. 17, the wire frame 127 is withdrawn, and the contained fins F thus are free to fall into the pockets 119, being readily guided thereinto by the beveled edges 86 of the holding fingers 80. As there is too much frictional resistance to permit the fins to fall freely to the bottom of the pockets P, a thrust fixture 130 (Fig. 16) is provided. This member has spaced depending portions 133 which are adapted to engage aligned slots 134 formed in the nest plates 121. When the fixture 130 is thrust downward, the underlying fins F are forced toward the bottom of the pockets P. The upper die unit 45 may then be swung into closed position, the upper bars 87 forcing the fins to their proper position, if they are not already fully located. During such closing action, the upper die elements 70 embrace the upper portions of the fin, thus bringing the parts into the relative positions heretofore described in connection with Fig. 12.

From the foregoing description, it will now be understood that, after the fins F are disposed between the die elements 68 in the pockets 119, the closing and securing of the upper head 45 firmly holds each fin between adjacent pairs of die elements 68 and 70, so that the tube impelling mechanism 30 may be operated to force the tubes through the fins. During the tube assembling operation, the leading loops 21 engage the weakened portions of the fins and act as bending or piercing dies to force the flap portions 28 of the fins rearward about the horizontal bending die portions 83 and 83a, as illustrated in Fig. 10.

The fins F are thus progressively transfixed by the tubes until the leading tube loops completely pass through the entire fin assembly, at which time the head 100 is fully extended from the cylinder 95. The valve 79 is then operated, to force the various cooperating die plates 68 and 70 together, and to the position shown in Figs. 11 and 13. During this action, the die surfaces 83 and 83a engage the flaps 28 to restore them to their original coplanar position. In order to compensate for the inherent resiliency of the fins, the dies are so formed as to induce a slight overbending of the flaps 28, which occurs near the end of the die strokes when the portions 83, 83a contact the inclined surfaces of the ribs 27 and force the flaps a slight distance to the right (Fig. 11). Simultaneously with the above-described bending operation, the quadrantal bending dies 84 and 84a engage the flanges 24 of the fins and restore them to their original cylindrical character. The relation between the die plates is such that, during the die closing movement, the flanges 24 are forcibly applied to the legs 20 of the tube T to effect a strong frictional engagement.

Upon reversal of the valve 79 to separate the dies 68 and 70, the frame 45 may be unlatched and swung back, whereupon the assembled fin and tube structure may be removed. If desired, the unit may be applied in practical use as it comes from the machine, or it may be dipped in solder to seal all joints and increase the thermal efficiency.

In some coil structures, there may be experienced some difficulty in preserving loop alignment during assembly. In such event, it is advantageous to employ a tube stop 140, as illustrated in Figs. 8 and 17. This member is slidably mounted on the left hand side wall of the lower frame 36 by screws 141 which engage in slots 142 formed therein. The right hand face of the stop 140 is formed with sockets 143 for receiving the leading tube loops 21 after the tube has been forced through the dies. Horizontal movement of the stop 140 in the direction of the tube unit is obtained by a cam mechanism including cams 144 mounted on an operating shaft 145 journalled in bearings 146.

The stop may be employed to limit the movement of the tube loops, and also may be operated by the cams to force the tube T slightly to the right, thereby springing the accompanying fins in their pockets for a slight alignment correction.

It will be appreciated that the present invention thus provides a novel and effective method of forming fin and tube assemblies, as well as a novel machine for assembling fins on tubes. While the invention has been described with reference to a single embodiment, and in the form of a complete machine, it will be understood by those skilled in the art that the objects and advantages of the invention may be attained by other forms of apparatus or modifications in procedure. It is therefore intended that the invention shall be deemed commensurate with the scope of the following claims.

I claim:

1. The method of assembling cross-fins on a length of tubing which comprises forming fins with weakened tube-receiving portions, supporting the fins, impacting the fins at said weakened portions with a length of tubing with sufficient force to penetrate said portions and transfix the fins, and applying pressure to all of said weakened portions simultaneously while the fins are supported to enhance the engagement between the tubing and fins.

2. The method of making a cross-fin and tube assembly which comprises mounting a plurality of fins having planar surface portions in spaced parallel relation, mounting a plurality of tubes for simultaneous movement perpendicular to said fins and the planar portions thereof, moving said tubes perpendicular to said fins to impinge said planar surfaces with sufficient force to deform the same and thereby permit said tubes to pass through all of the fins, and applying pressure to all of the impinged and deformed portions of said fins simultaneously while said fins are maintained in said spaced parallel relation to enhance the frictional engagement between said tubes and fins.

3. The method of making a cross-fin and tube assembly which comprises forming a plurality of fins with weakened tube-receiving portions, assembling said fins in spaced parallel relation, impinging said fins at said weakened portions with a plurality of tubes and with sufficient force to cause said tubes to penetrate all of said fins and deform the impinged weakened portions into planes substantially parallel to said tubes, and thereafter applying pressure to all of said deformed portions simultaneously to enhance the frictional engagement between said tubes and fins.

4. The method of building up a cross fin and tube assembly which comprises forming a length of tubing with substantially parallel stretches connected by integral return bends at the points of reversal thereof, forming a plurality of cross fins with tube-receiving apertures spaced the same as said tube stretches, weakening the zones of the fin between said apertures, supporting a plurality of said fins in closely spaced relation, impacting the fins while so supported at said apertured portions with said return bends while effecting relative movement between all of said fins and said tubing, whereby the fins and tubing will be mutually assembled and the weakened portions will be deformed away from the face of the fin, and thereafter simultaneously restoring the deformed portions to a position between said stretches.

5. The method of making fin and tube assemblies which comprises forming a continuous tube with substantially parallel stretches connected by integral return bends, forming a plurality of substantially planar cross fins with spaced tube receiving apertures connected by slits, supporting a plurality of said fins in closely spaced relation, impacting the fins while so supported seriatim with said return bends to cause the tubes to transfix the fins and simultaneously strike out the portions of the fins between said apertures, and simultaneously pressing the struck out portions of the fins back to substantially their original position to enhance the engagement between the fins and tubing.

6. The method of making fin and tube assemblies comprising bending a length of tubing into serpentine form to provide a plurality of parallel stretches connected one to the other by integral return bends, forming a plurality of substantially planar cross fins with apertures spaced in accordance with the spacing between said stretches, weakening the fins at alternate spaces between said apertures, supporting in parallelism a plurality of said fins in closely spaced relation, impacting said apertures and the weakened portions therebetween with the return bends of said tubing with sufficient force to cause said bends to strike out the fins between said apertures and to transfix the plurality of fins with said tubing, and simultaneously bending the struck out portions of the fins back into substantially the planes of the fins to enhance the engagement between the fins and the stretches of tubing.

7. The method of making fin and tube assemblies wherein the tube consists of at least two substantially parallel lengths connected at one end by an integral return bend and the fins are integral and extend transverse to and over both of said lengths, which comprises the steps of assembling in spaced parallel relation a plurality of fins, impacting said fins seriatim with the return bend of said tube with sufficient force to transfix said fins and strike out the material thereof between said tube lengths, and thereafter applying pressure simultaneously to all of said struck out portions of the fin to restore them into the plane of the fin and in tight engagement with said lengths.

8. The method of making fin and tube assemblies wherein the tube consists of at least two substantially parallel lengths connected at one end by an integral return bend and the fins are disposed transversely of said lengths and encircle the same, which comprises the steps of forming the fins with spaced apertures conforming substantially to the spacing of the lengths and the shape and size of the cross sections thereof, slitting without substantial deformation the fins between said perforations, mounting a plurality of said fins in spaced parallel relation, impacting said fins seriatim while held in said relation with the return bend of the tube against said slitted portion and with sufficient force to cause the tubes to transfix the fins and to deform the slit portions along the line of movement of said tube, and thereafter impacting said slit portions in a direction substantially parallel to the planes of the fins to restore said slit portions to their original positions and to enhance the frictional engagement between the fins and said lengths.

9. The method of making fin and tube assemblies wherein the tube consists of at least two substantially parallel lengths connected at one end by a return bend and the fins are disposed transversely of the lengths and encompass the same, which comprises weakening the fins over a surface portion thereof corresponding in width to the spacing of the lengths, impacting the return bend of the tube against such portions seriatim to assemble a plurality of said fins on the tube, and thereafter simultaneously applying pressure to the material of the fins between said lengths and in a direction substantially parallel to the surfaces of the fins to form a substantially continuous fin surface between said lengths.

STANISLAUS PRZYBOROWSKI.